UNITED STATES PATENT OFFICE 2,595,907

POLYMERIZABLE AND POLYMERIZED ACRYLONITRILE - DIALKYLAMINOPROPYL-ACRYLAMIDE COMPOSITIONS

Walter M. Thomas, Springdale, and John A. Price, Stamford, Conn., assignors to American Cyanamid Company, New York, N. Y., a corporation of Maine No Drawing. Application December 30, 1950, Serial No. 203,799

8 Claims. (Cl. 260—85.5)

This invention relates to new and useful compositions of matter, and more particularly is concerned with polymerizable and polymerized acrylonitrile compositions. Still more particularly the present invention is directed to polymerizable compositions comprising (1) a compound represented by the general formula

I

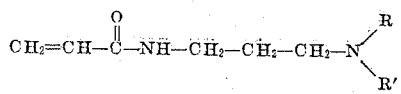

where R and R' each represents a lower alkyl radical, that is, an alkyl radical containing from one to six carbon atoms, inclusive, and (2) acrylonitrile, the compound of (1) constituting from about 0.5% to about 15% by weight of the total amount of (1) and (2). Illustrative examples of lower alkyl radicals represented by R and R' in the above formula are methyl, ethyl, propyl, isopropyl, n-butyl, isobutyl, sec.-butyl, tert.-butyl, the various amyls (e. g., n-amyl, isoamyl, etc.), and the various hexyls. A specific example of a compound embraced by Formula I is dimethylaminopropylacrylamide having the formula

II

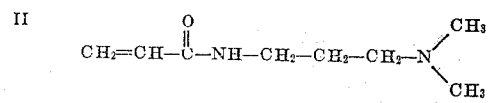

This compound may be named N-(3-dimethylaminopropyl)acrylamide. The scope of the invention also includes products comprising such polymerized compositions, e. g., a product (or a composition) comprising a copolymer of a mixture containing N - (3 - dimethylaminopropyl) acrylamide and acrylonitrile in a weight ratio of from about 0.5% to about 15% of the former to from about 99.5% to about 85% of the latter, including a copolymer of mixed monomers consisting of from 1% to 10% of a compound embraced by Formula I [e. g., N-(3-dimethyl)-, N-(3-diethyl)-, N-(3-monomethylmonoethyl)-, N-(3-di - n - propyl)-, N-(3-di-n-butylaminopropyl) acrylamide, etc.] and the remainder acrylonitrile; and, also, methods of preparing such compositions or products.

The present invention has, as one of its main objects, the production of new acrylonitrile copolymer compositions which are more readily dyed, especially with acid dyes, than homopolymeric acrylonitrile or many of the copolymers of acrylonitrile and another monomer or monomers that were known or suggested prior to my invention.

Another object of the invention is to prepare such copolymers which can be spun or otherwise shaped to form filaments, tapes, ribbons, rods, tubes, sheets, etc., and the shaped articles then dyed either before or after having been oriented to improve their useful properties.

Other objects of the invention will be apparent to those skilled in the art from the description and examples which follow.

These objects are accomplished, in general, by preparing a copolymer of ingredients comprising acrylonitrile and a compound (or a plurality of compounds) of the kind embraced by Formula I. The copolymer advantageously is produced, for instance, by polymerizing in an aqueous medium, with the aid of a polymerization catalyst (or catalysts), a mixture of comonomers including (1) a compound of the kind covered by Formula I and (2) acrylonitrile, the compound of (1) constituting from about 0.5% to about 15% by weight of the total amount of (1) and (2); and, at the end of the polymerization period, isolating the resulting copolymer.

Any suitable means may be used in effecting copolymerization of the acrylonitrile with the compound embraced by Formula I. Heat, light, or both heat and light, with or without a polymerization catalyst, can be used. A polymerization catalyst preferably is employed in order to shorten the period of time required for polymerization of the mixture of ingredients comprising acrylonitrile and the dialkylaminopropylacrylamide. Any of the polymerization catalysts which are suitable for use in polymerizing compounds containing an ethylenically unsaturated grouping, specifically a vinyl grouping, can be employed. Among such catalysts are the inorganic peroxides, e. g., hydrogen peroxide, barium peroxide, magnesium peroxide, etc., and the various organic peroxy catalysts, illustrative examples of which latter are: the dialkyl peroxides, e. g., diethyl peroxide, dipropyl peroxide, dilauryl peroxide, dioleyl peroxide, distearyl peroxide, di-(tert.-butyl) peroxide and di-(tert.-amyl) peroxide, such peroxides often being designated as ethyl, propyl, lauryl, oleyl, stearyl, tert.-butyl and tert.-amyl peroxides; the alkyl hydrogen peroxides, e. g., tert.-butyl hydrogen peroxide (tert.-butyl hydroperoxide), tert.-amyl hydrogen peroxide (tert.-amyl hydroperoxide), etc.; symmetrical diacyl peroxides, for instance peroxides which commonly are known under such names as acetyl peroxide, propionyl peroxide, lauroyl peroxide, stearoyl peroxide, malonyl peroxide, succinyl peroxide, phthaloyl peroxide, benzoyl peroxide, etc.; fatty oil acid peroxides, e. g., coconut oil acid peroxides, etc.; unsymmetrical or mixed diacyl peroxides, e. g., acetyl benzoyl peroxide, propionyl benzoyl peroxide, etc.; terpene oxides, e. g., ascaridole, etc.; and salts of inorganic per-acids, e. g., ammonium persulfate, sodium persulfate, potassium persulfate, sodium percarbonate, potassium percarbonate, sodium perborate, potassium perborate, sodium perphosphate, potassium perphosphate, etc. Other examples of organic peroxide catalysts that can be employed are the following:

Tetralin hydroperoxide
Tert.-butyl diperphthalate
Cumene hydroperoxide
Tert.-butyl perbenzoate
2,4-dichlorobenzoyl peroxide
Urea peroxide
Caprylyl peroxide
p-Chlorobenzoyl peroxide
2,2-bis(tert.-butyl peroxy) butane
Hydroxyheptyl peroxide
Diperoxide of benzaldehyde Other so-called "free radical" types of catalysts, e. g., $\alpha,\alpha'$-azodiisobutyronitrile, also can be used to accelerate polymerization.

If desired, the mixture of monomers can be polymerized in emulsion or in solution state to yield a copolymer. Good results are obtained by effecting copolymerization while the monomers are dissolved in a suitable solvent, preferably water or a liquid solvent comprising mainly water. Suitable inert organic solvents also can be used if desired, e. g., benzene, toluene, xylene, etc. Preferably the copolymerization reaction is carried out in a liquid medium in which the monomeric mixture is soluble but the copolymer is insoluble, e. g., water.

The polymerization also can be effected by conventional bulk polymerization technique, in the presence or absence of a solvent capable of dissolving the monomeric mixture and in which the latter preferably is inert; or by conventional bead polymerization methods. The polymerization of the mixture of monomers can be effected by a continuous process as well as by a batch operation.

The concentration of the catalyst is relatively small, e. g., from, by weight, about 1 part of catalyst per 1000 parts of the monomeric mixture to about 3 or 4 parts of catalyst per 100 parts of the mixture of monomers.

The temperature of polymerization of the polymerizable composition comprising acrylonitrile and N-[3-di-(lower alkyl)-aminopropyl]-acrylamide in the proportions specified in the first paragraph of this specification can be varied over a wide range, up to and including or slightly above the boiling point (at atmospheric pressure) of the monomeric mixture. In most cases, the polymerization temperature will be within the range of about 20° or 30° C., preferably at least 35° or 40° C., up to the boiling temperature of the mixture of monomers, depending, for example, upon the particular catalyst, if any, used, the rapidity of polymerization wanted and other influencing factors. The use of polymerization temperatures substantially above the boiling point of the mixture of monomers is not precluded, but generally is less desirable because the polymerization reaction then must either be carried out in a closed reaction vessel under pressure, or, for economical reasons, with a reflux condenser or other means provided for the recovery and re-use of the volatilized monomer or monomers if the reaction is carried out at the boiling temperature of the mass under atmospheric pressure.

If desired, the monomers may be copolymerized in the presence of a plasticizer for the copolymer in a manner similar to that disclosed in the copending application of Walter M. Thomas, Serial No. 780,309, filed October 16, 1947, now Patent No. 2,558,396, dated June 26, 1951. Other copolymerization methods, however, also may be employed, e. g., methods such as those described in U. S. Patents 2,140,048, 2,160,054, 2,194,354, 2,333,635, 2,436,926, and British Patent 586,881 with reference to the production of other polymerization products. The copolymers of ingredients comprising combined acrylonitrile and an N-substituted acrylamide of the kind embraced by Formula I may be produced in various molecular weights, depending, for instance, upon thhe particular polymerization conditions employed but ordinarily are within thhe range of about 15,000 to about 300,000 or higher as calculated from viscosity measurements using thhe Staudinger equation (reference: U. S. Patent No. 2,404,713).

If the copolymerization reeaction is carried out while the mixed monomers are dissolved or dispersed in a liquid medium, e. g., in solution in water, the resulting copolymer then is separated from the said medium by any suitable means, e. g., by filtration, centrifuging, solvent extraction, etc.

The dialkylaminopropylacrylamides used in practicing the present invention can be prepared, for example, by effecting reaction between acrylyl chloride and a dialkylaminopropylamine corresponding to the dialkylaminopropylacrylamide desired. The dialkylaminopropylamine reactant can be prepared, for instance, by effecting reaction between acrylonitrile and an amine represented by the formula III 

where R and R' have the same meanings as given above with reference to Formula I, thereby to form a nitrile represented by the formula IV 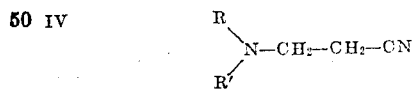

and hydrogenating the latter to form the corresponding dialkylaminopropylamine.

In order that those skilled in the art may better understand how the present invention can be carried into effect, the following examples are given by way of illustration and not by way of limitation. All parts and percentages are by weight.

*Example 1*

This example illustrates the preparation of N-(3-dimethylaminopropyl) acrylamide.

| | Parts |
|---|---|
| Acrylyl chloride | 211 |
| Dimethylaminopropylamine | 233 |
| Acetonitrile | 365 |
| Hydroquinone | 1 |

All of the above ingredients with the exception of the dimethylaminopropylamine were charged to a reaction vessel provided with a stirrer, thermometer, reflux condenser and addition funnel.

The vessel was placed in a heated water bath. The dimethylaminopropylamine was added slowly to the reaction mass over a period of 2 hours and 20 minutes while heating the mass at 44–53° C. Heating was contained at approximately this same temperature for 1 hour and 25 minutes after all of the dimethylaminopropylamine had been added. At the end of the reaction period, the reaction mass was treated with an aqueous sodium hydroxide solution produced by dissolving 95.3 parts of 97.8% NaOH in 233 parts of water. The resulting precipitate of sodium chloride was filtered off, and the solvents were stripped from the filtrate using a water aspirator. Crude N-(3-dimethylaminopropyl)acrylamide was obtained as a fraction boiling at 115°–120° C. at 2 mm. pressure. This material was purified by redistillation to yield N-(3-dimethylaminopropyl)-acrylamide with a boiling range of 106°–108° C. at 1 mm. pressure.

*Example 2*

This example illustrates the preparation of homopolymeric acrylonitrile, which are subsequently employed in comparative tests with N-(3-dimethylaminopropyl)acrylamide-acrylonitrile copolymers of the present invention.

A reaction vessel, equipped with a stirrer, reflux condenser, thermometer and gas-inlet tube, was placed in a constant-temperature bath which was maintained at 35° C. To the vessel was added a solution of 53.0 parts of acrylonitrile, 900 parts of distilled water and 0.029 part of sulfuric acid. A rapid stream of pre-purified nitrogen was passed over the surface of the solution for 30 minutes. The nitrogen flow was then reduced to about one bubble per second. A reduction-oxidation catalyst system ("redox" system) consisting of 1.71 parts of ammonium persulfate and 0.71 part of sodium meta-bisulfite, each dissolved in 50 parts of water, was then added. The solution first became cloudy at the end of 3 minutes, and the polymerization was fairly exothermic for the first half hour. The polymerization was continued for a total of 4 hours at 35° C. The pH of the reaction product was 3.1. The polymer was collected on a Büchner funnel, washed with 1000 parts of distilled water followed by about 160 parts of methanol. The polymer was dried in an oven at 70° C. for about 16 hours. The yield of dry polyacrylonitrile, which was white, amounted to 48 parts.

*Example 3*

This example differs from Example 2 in that 1, 2 and 5% of the acrylonitrile there employed was replaced, in a series of separate tests, with N-(3-dimethylaminopropyl)acrylamide, and the pH of the initial solutions was adjusted to 3.0–3.5 by the addition of 6 N sulfuric acid. The procedure otherwise was essentially the same as described in the prior example. Copolymers of acrylonitrile and N-(3-dimethylaminopropyl)-acrylamide were obtained in amounts ranging from 39 to 50 parts of dry product, depending upon the percentage of N-(3-dimethylaminopropyl)acrylamide used in the mixture of monomers, as compared with the yield of 48 parts of dry polyacrylonitrile (homopolyacrylonitrile) obtained in Example 2.

*Example 4*

A reaction vessel was charged with an emulsion consisting of 135 parts of acrylonitrile, 15 parts of N-(3-dimethylaminopropyl)acrylamide, 0.5 part of an emulsifying agent, more particularly a sodium sulfate of a long-chain aliphatic hydrocarbon, and 750 parts of distilled water. The pH of the initial emulsion was adjusted to 3.4 by the addition of 6 N sulfuric acid. A stream of nitrogen was passed over the surface of the emulsion for 30 minutes, after which the nitrogen flow was reduced to about one bubble per second. A reduction-oxidation catalyst system consisting of 1 part of ammonium persulfate and 0.492 part of potassium meta-bisulfite, each dissolved in 50 parts of water, was then added. The temperature was maintained at 35° C. At the end of 4 hours the emulsion was completely broken. The copolymer was collected on a Büchner funnel, washed with 1000 parts of water and then dried in an oven at 70° C. for about 16 hours. A white, dry copolymer of acrylonitrile and N-(3-dimethylaminopropyl)acrylamide was obtained in a yield amounting to 92 parts.

*Example 5*

Samples of the homopolymeric acrylonitrile of Example 2 and of the copolymers of Examples 3 and 4 were subjected to the following dye test:

A sample (10 parts) of the dry polymer or copolymer was added to a dye bath consisting of 500 parts of an aqueous solution containing 0.2 part of concentrated sulfuric acid, 1 part of sodium sulfate and 0.2 part of Calcocid Alizarine Blue SAPG (Color Index No. 1054). The dye bath was boiled for 30 minutes, after which the polymerization product was filtered off and washed with hot water until the water was free of dye. The copolymers of Examples 3 and 4 were dyed blue, the intensity being directly proportional to the percentage of N-(3-dimethylaminopropyl)acrylamide used in forming the copolymer; that is, copolymers containing the higher content of N-(3-dimethylaminopropyl)acrylamide yielded the deeper dyeings. In marked contrast, the homopolymeric acrylonitrile of Example 2 failed to absorb any dye. The advantage of modifying an acrylonitrile polymerization product by replacing a part (e. g., from about 0.5% to about 15% or more, still more particularly from 1 or 2% to 5 or 10%) of the initial acrylonitrile with N-(3-dimethylaminopropyl)acrylamide or other compound of the kind embraced by Formula I, thereby to obtain a copolymeric acrylonitrile substance of improved dyeability, is therefore quite apparent.

*Example 6*

| | Parts |
|---|---|
| Acrylonitrile | 49.9 |
| N-(3-dimethylaminopropyl)acrylamide | 0.53 |
| Methyl acrylate | 2.65 |
| Water | 900.0 |
| 6 N $H_2SO_4$ | 0.7 |
| Ammonium persulfate in 50 parts water | 1.71 |
| Sodium meta-bisulfite in 50 parts water | 0.36 |

A reaction vessel, equipped with a stirrer, reflux condenser, thermometer and gas-inlet tube, was placed in a water bath maintained at a temperature 28° C.–35.5° C. A solution of all of the above ingredients, with the exception of the acrylonitrile, methyl acrylate, ammonium persulfate and sodium meta-bisulfite, was added to the reaction vessel. A rapid stream of pre-purified nitrogen was passed over the surface of the solution for 30 minutes. The nitrogen flow was then reduced to one bubble per second. The remaining ingredients were added, the solution becoming cloudy after stirring for 5 minutes at a temperature of 27°–29° C. The reaction was allowed to proceed at about 35.5° C., while continuing the stirring, for a total of about 5 hours and 50 minutes. The copolymer was collected on a Büchner funnel, washed with 2000 parts of deionized water, and dried in an oven at 70° C. for about 16 hours. The yield of dry, white copolymer amounted to 50 parts, or about 94.5% of the theoretical. When this copolymer was tested for its dyeability as described under Example 5, it was dyed blue.

*Example 7*

A spinning solution was produced by dissolving 475 parts of an N-(3-dimethylaminopropyl)-acrylamide-acrylonitrile copolymer (obtained by polymerizing a mixture of 95% acrylonitrile and 5% N-(3-dimethylaminopropyl)acrylamide as described under Example 3) in a concentrated aqueous solution of sodium thiocyanate (about 50% NaSCN in water). The copolymer had an average molecular weight of about 71,400, as calculated from viscosity measurements using the Staudinger equation. The resulting solution was filtered, placed under vacuum and allowed to deaerate for about 66 hours. The solution contained about 9.46% of copolymer. Its viscosity, as measured by the time required for a Monel ball (one-eighth inch in diameter and weighing 0.1418 gram) to fall through 20 cm. of solution at 61° C., was 10 seconds.

The solution was spun into a fiber by extruding it through a spinneret, having 40 holes 90 mm. in diameter, into coagulating bath comprising water maintained at a temperature of about 0° C. The spun fiber in gel state was continuously passed over a pair of converging wash rolls while it was advancing in a helical path. The fiber was rinsed with water on the rolls to remove excess thiocyanate. The washed fiber was stretched 850% by passing it through a bath of hot water maintained at a temperature of about 99.5° C., and then was taken upon bobbins where it was kept in gelled state by applying a fine spray of water while the fiber was being collected on the bobbin. Additional information on the spinning conditions are given below:

Extrusion rate_____cc. per minute__ 3.6
Temperature of solution
  at the spinning head _____°C__ 53
Pullaway speed_____meters per minute__ 5.35
Bobbin speed_____do____ 45.5
Calculated denier of the
  fiber _____ 89

Individual swatches of the gelled fiber were bleached by bringing to a boil in 3% aqueous hydrogen peroxide, followed by water washing, then bringing to a boil in 35% nitric acid, and again washing with water. After drying at room temperature, the bleached swatches dyed in the same manner as described under Example 5. The fibers were dyed to a deep shade of blue. In marked contrast, a fiber similarly prepared from homopolymeric acrylonitrile remained colorless when placed in the same dye bath for the same length of time.

It will be understood, of course, by those skilled in the art that our invention is not limited to the specific ingredients named in the above illustrative examples nor to the particular proportions and methods of copolymerization mentioned therein. Thus, instead of the reduction-oxidation (redox) catalyst system named in the different examples, any other polymerization catalyst or combination of polymerization catalysts, numerous examples of which have given hereinbefore, can be used. Other catalysts and redox-catalyst systems that can be employed are given, for example, in the copending application of Arthur Cresswell, Serial No. 76,667, filed February 15, 1949, and in the various patents mentioned therein.

Likewise, other modifying comonomers, in addition to the methyl acrylate named in Example 6, can be used. Illustrative examples of such comonomers are vinyl compounds which are different from acrylonitrile (vinyl cyanide), including the vinyl aromatic compounds, more particularly the vinyl aromatic hydrocarbons (e. g., styrene, isopropenyl toluene, the various dialkyl styrenes, etc.), other aliphatic compounds containing a $CH_2=C<$ grouping, e. g., the various substituted acrylonitriles (e. g., methacrylonitrile, ethacrylonitrile, phenylacrylonitrile, etc.), acrylamide and the various substituted acrylamides (e. g., methacrylamide, ethacrylamide, the various N-substituted acrylamides which are different from those used in practicing the present invention and the various N-substituted alkacrylamides, for instance N-methylol acrylamide, N-monoalkyl and -dialkyl acrylamides and methacrylamides, e. g., N-monomethyl, -ethyl, -propyl, -butyl, etc., and N-dimethyl, -ethyl, -propyl, -butyl, etc., acrylamides and methacrylamides, N-monoaryl and -diaryl acrylamides and alkacrylamides, e. g., N-monophenyl and -diphenyl acrylamides and methacrylamides, etc.), vinyl esters, e. g., vinyl acetate, vinyl propionate, vinyl butyrate, vinyl isobutyrate, vinyl valerate, vinyl acrylate, vinyl methacrylate, etc., esters of an acrylic acid (including acrylic acid itself and the various alpha-substituted acrylic acids, e. g., methacrylic acid, ethacrylic acid, phenylacrylic acid, etc.), more particularly the alkyl esters of an acrylic acid, e. g., the ethyl, propyl, isopropyl, n-butyl, isobutyl, sec.-butyl, tert.-butyl, amyl, hexyl, heptyl, octyl, decyl, dodecyl etc. esters of acrylic, methacrylic, ethacrylic, phenylacrylic, etc., acids including the alkyl acrylates containing not more than four carbon atoms in the alkyl grouping, examples of which are given above, as well as other vinyl aromatic and vinyl aliphatic compounds, and other compounds containing a $CH_2=<$ grouping, more particularly a single $CH_2=<$ grouping.

The proportions of any modifying comonomer or comonomers that are incorporated in the polymerizable composition together with the acrylonitrile and the dialkylaminopropylacrylamide can be varied as desired or as conditions may require. Ordinarily, however, the acrylonitrile constitutes a major or preponderant proportion (more than 50%) by weight of the total weight of monomers to be copolymerized, the substituted acrylamide constitutes from about 0.5% to about 15% of the total weight of the acrylonitrile and substituted acrylamide, and any modifying comonomer or comonomers (if present in the polymerizable mixture) constitute the remainder of the total amount of comonomers which are subjected to copolymerization.

In the preferred copolymer compositions (more particularly thermoplastic copolymer compositions) of the present invention, the acrylonitrile is employed in the mixture of comonomers in an amount such that at least 85% by weight of combined acrylonitrile is present in the copolymer. When the polymerization rates of the acrylonitrile and additional monomer or monomers are different from each other, then it may be necessary to start with an amount of acrylonitrile either more or less than 85% by weight of the total mixture of monomers in order that the final copolymer will contain at least 85% by weight of combined acrylonitrile in the copolymer molecule. Similarly, in order that the finished copolymer shall contain, in the copolymer molecule, from about 0.5% to about 15% by weight of combined dialkylaminopropylacrylamide, preferably between about 1 or 2% and about 10%, it may be necessary to start with an amount of the substituted acrylamide either more or less than that which is present in the finished copolymer in order that the said copolymer will have the ultimate composition desired or required in order to impart optimum dye receptivity thereto.

Although the new copolymers of this invention are particularly useful in the formation of fibers or filaments which are more amenable to dyeing than homopolymeric acrylonitrile, they also have numerous other applications in the plastics and coating arts. For instance, with or without a filler or other additive, they may be used as molding compositions (or as components of molding compositions) from which molded articles are produced by molding the compositions under heat and pressure, e. g., temperatures of the order of 130° C. or 140° C. to 200° C. and under pressures up to 10,000 pounds or more per square inch. Among the fillers that can be employed in the production of molded compositions are alpha-cellulose pulp, asbestos fibers, cotton flock, chopped cloth cuttings, glass fibers, wood flour, antimony oxide, titanium dioxide, sand, clay, mica dust, diatomaceous earth, etc.

The polymerizable compositions of our invention can be used in the production of castings of any desired shape or size; as adhesives; in the treatment of paper or paper stock; in coating compositions; and for various other purposes. The copolymer can be formed in situ after application of the monomeric mixture to the base material to be coated, impregnated or otherwise treated.

Fibers can be produced from the copolymers of the present invention in the manner described in, for example, the copending application of Arthur Cresswell, Serial No. 76,688, filed February 15, 1949, with particular reference to the production of a molecularly oriented fiber from a copolymer of acrylonitrile and allyl alcohol. The unoriented and oriented fibers produced from our new copolymers are readily dyed, especially with an acid dye, while the fiber is in either a gel (e. g., aquagel) or a dry state.

In a manner similar to that described hereinbefore with reference to the production of copolymers of acrylonitrile and compounds of the kind embraced by Formula I, other acrylonitrile copolymers can be produced by using other compounds embraced by the following, broader, general formula:

V
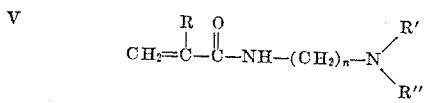

where R represents hydrogen or a lower alkyl radical (e. g., a methyl radical), R' and R'' each represents hydrogen, or an alkyl or aryl radical, and $n$ represents a whole number, for instance from 1 to 10, inclusive.

We claim:
1. A polymerizable composition comprising (1) a compound represented by the general formula

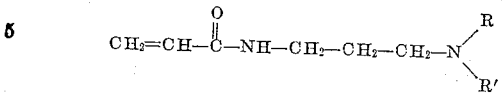

where R and R' each represents an alkyl radical containing from one to six carbon atoms, inclusive, and (2) acrylonitrile, the compound of (1) constituting from about 0.5% to about 15% by weight of the total amount of (1) and (2).

2. A polymerizable composition as in claim 1 wherein the compound of (1) is dimethylaminopropylacrylamide having the formula

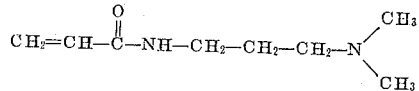

3. A product comprising the polymerized composition of claim 1.

4. A composition comprising a copolymer of a mixture containing N-(3-dimethylaminopropyl)-acrylamide and acrylonitrile in a weight ratio of from about 0.5% to about 15% of the former to from about 99.5% to about 85% of the latter.

5. A copolymer of mixed monomers consisting of from 1% to 10% by weight of a compound represented by the general formula

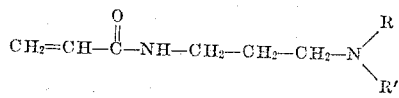

where R and R' each represents an alkyl radical containing from one to six carbon atoms, inclusive, and the remainder acrylonitrile.

6. A copolymer of mixed monomers consisting of from 1% to 10% by weight of N-(3-dimethylaminopropyl) acrylamide and the remainder acrylonitrile.

7. The method of preparing a new copolymer which comprises polymerizing in an aqueous medium, with the aid of a polymerization catalyst, a mixture of comonomers including (1) a compound represented by the general formula

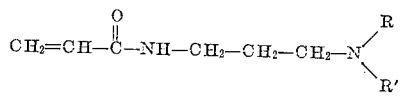

where R and R' each represents an alkyl radical containing from one to six carbon atoms, inclusive, and (2) acrylonitrile, the compound of (1) constituting from about 0.5% to about 15% by weight of the total amount of (1) and (2), and isolating the resulting copolymer.

8. A fiber formed from a copolymer of copolymerizable ingredients including (1) a compound represented by the general formula

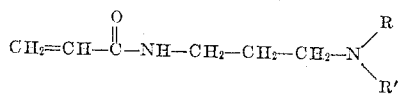

where R and R' each represents an alkyl radical containing from one to six carbon atoms, inclusive, and (2) acrylonitrile, the compound of (1) constituting from about 0.5% to about 15% by weight of the total amount of (1) and (2).

WALTER M. THOMAS.
JOHN A. PRICE.

No references cited.